United States Patent

Cazcarra Pallaruelo

Patent Number: 5,439,030
Date of Patent: Aug. 8, 1995

[54] REGULATION VALVE FOR HIGH PRESSURE SURGES

[75] Inventor: Sebastian Cazcarra Pallaruelo, Zaragoza, Spain

[73] Assignee: Badain S.L., Lafortunada, Spain

[21] Appl. No.: 137,067

[22] PCT Filed: Feb. 25, 1993

[86] PCT No.: PCT/ES93/00013
§ 371 Date: Oct. 21, 1993
§ 102(e) Date: Oct. 21, 1993

[87] PCT Pub. No.: WO93/17265
PCT Pub. Date: Sep. 2, 1993

[30] Foreign Application Priority Data

Feb. 26, 1992 [ES] Spain ................................. 9200421

[51] Int. Cl.$^6$ ............................................. F16K 47/00
[52] U.S. Cl. ........................ 137/614.11; 251/121; 251/282
[58] Field of Search ................. 137/614.11; 251/282, 251/121

[56] References Cited

U.S. PATENT DOCUMENTS

| | | | |
|---|---|---|---|
| 974,337 | 11/1910 | Aslakson | 137/614.11 |
| 2,931,615 | 4/1960 | Campbell | 251/282 |
| 3,799,199 | 3/1974 | Rumpff | 251/282 |

Primary Examiner—A. Michael Chambers
Attorney, Agent, or Firm—Peter L. Michaelson; Jeffery J. Brosemer

[57] ABSTRACT

Control valve for high pressure drop, which includes:
(1) Seat ring with an extension on the lower side formed by a drilled cylinder
(2) Cylinder which guides the plug and is also drilled in its lower side
(3) Plug, with diameter decreasing in steps from the upper to the lower side, these plug diameters combined with the inside diameters of cylinder and seat ring, create inner chambers or intermediate stages, which divide the total pressure drop of the fluid across the valve in several smaller pressure drops, in a preferred design as shown in FIG. 1, there are 3 inner stages.
(4) A lower ring chamber in between diameter of the plug (3) and the inner diameter of the seat ring (1).
(5) A cylinder chamber, inside the plug (3) which is hollow, and
(6) An upper ring chamber formed by the intermediate plug (3) diameter and the inner diameter of the cylinder (2).

Chamber (4) and (6) are also balancing chambers in that the pressure around the plug is the same all around. Sizes of chambers (4), (5) and (6) are calculated so that the plug is balanced also in vertical direction at any position along its vertical movement.

5 Claims, 2 Drawing Sheets

REGULATION VALVE FOR HIGH PRESSURE SURGES

The objective of this application is a pressure reducing valve intended for high pressure drop services which offers outstanding innovations and important advantages over existing control valves used in similar services.

It is well known that when the pressure drop across a control valve is high, there will be noise, vibrations and fast wearing of the parts of the valve which throttle or control the flow, the plug, the seat ring and the cage or cylinder.

Also there is a friction between the moving parts, due to the difference in pressure in the left-right sides of the valve (which is asymmetric) and pushes in the horizontal direction the plug against the cylinder.

Also, if the plug is not balanced in the vertical direction, the force required by the plug to be moved will be larger, and the movement will not be smooth unless oversized actuators are used.

Referring to the state of the art, it has to be said that there are several types of control valves, which either do not solve the problem or they solve the problem in a complicated and costly way, as we are going to see.

A solution is to have 2 or more control valves one after the other, each of them taking a part of the total pressure drop, which is an expensive solution.

There are also control valves having inside complex throtting cages, made of several disc stacks or cylinders, one above or inside the other, which also divide the total pressure drop across the valve in two or more pressure drops, but increasing enormously the complexity of the design and the cost, and also reducing the flow capacity of the valve.

Also, the problem of the side forces, which give friction and wearing of plug and cylinder, has not been solved yet. In existing designs large parts of the plug are exposed to differential pressure around its cylindric surface, this giving side forces, proportional to the surface and the pressure differences. It gives vibration sometimes, friction and wearing in all cases. This is a particularly serious problem in large size valves.

The new control valve which is the object of this application, designed for high pressure drop, reduces the total pressure drop in several stages, gradually, and eliminates in a simple way noise, vibration and wearing problems.

The new design of the internal parts of the valve makes the fluid to change direction several times and creates also internal chambers which are intermediate steps or stages of the pressure.

This design solves for the first time the problem of the side forces, by means of the balancing ring chambers. This chambers are ring spaces around the plug which balance the side forces acting in a horizontal direction. In this way the plug is not pushed against the guiding cylinder and friction and wearing are reduced.

Also the plug has been designed with a middle chamber sized to allow the pass of flow and to compensate the forces in the vertical direction. So the plug is balanced at all positions along its stroke and the forces required to move it are very reduced.

To give a detailed description of the invention, reference will be made to the enclosed figure, which, as an example and without being limited to, has been represented as a preferred but not the only way of execution.

Figure 1:
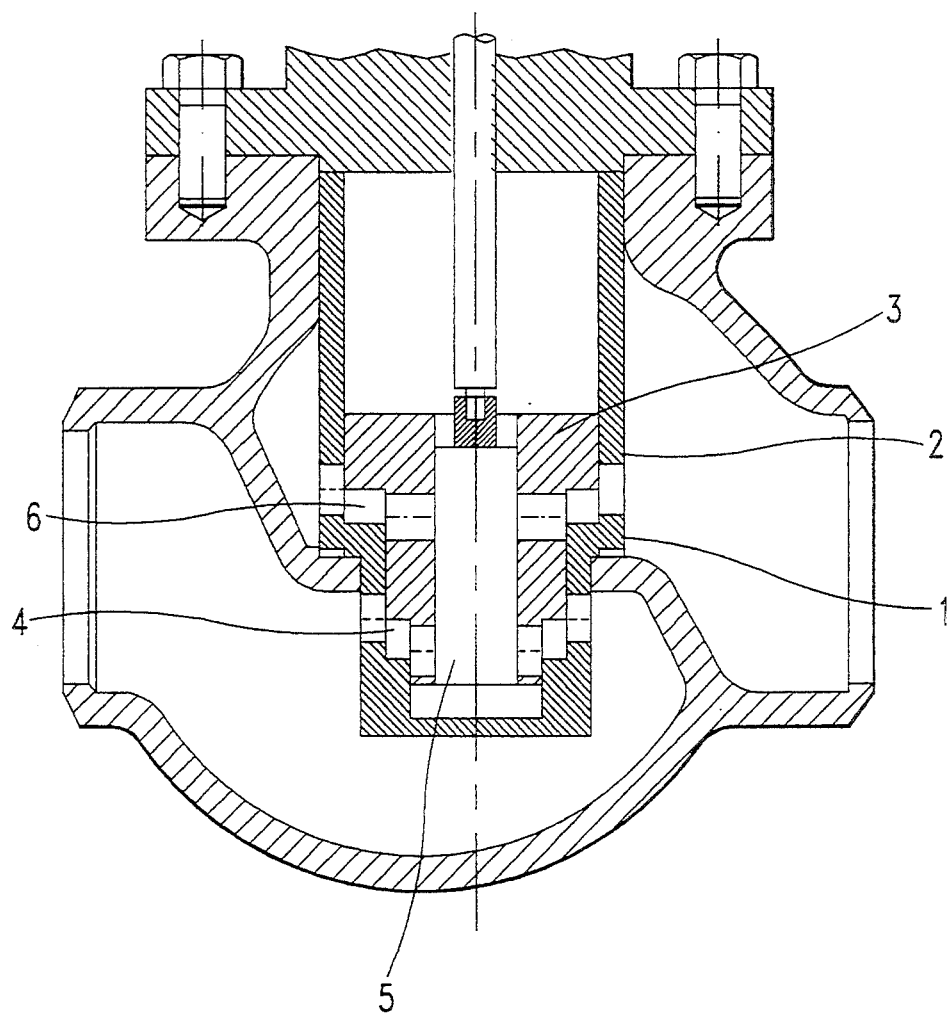
FIG. 1 represents a sectional view of the valve object of the invention.

In FIG. 1 are shown the main parts of the valve:
(1) The seat ring which has a drilled cylinder in its lower side
(2) The cylinder also drilled and
(3) The plug which is hollow and has from top to bottom three diameters decreasing in size.

The design is based on the division of the total pressure drop on several minor pressure drops. To achieve this it creates inner chambers or intermediate stages, in the way of the flow, combining the different diameters of the plug with the correlated diameters of the seat ring 2, 3, 4 or more steps as required by the total pressure drop.

Figure 2:
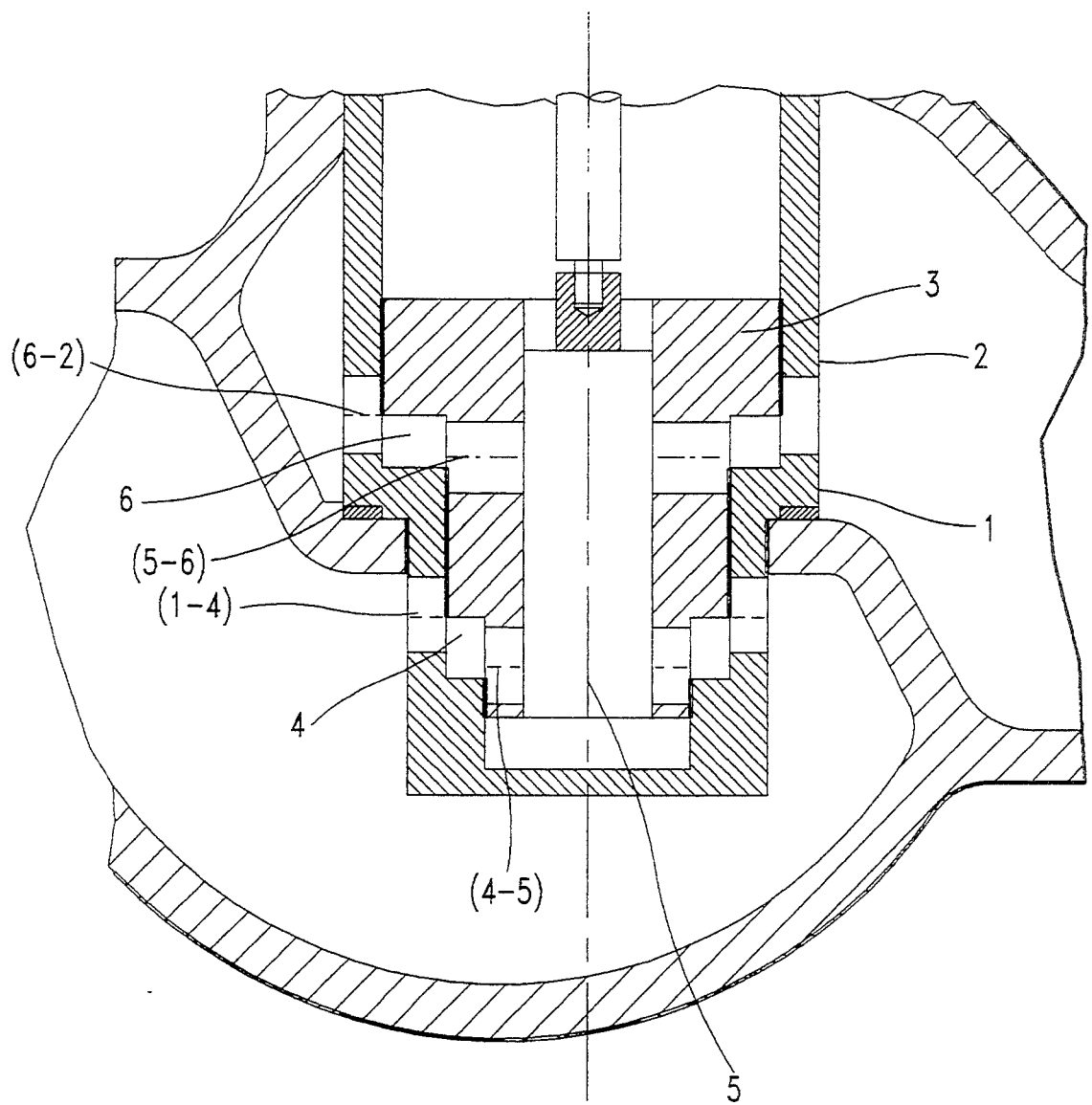
FIG. 2 represents a detail of FIG. 1

In FIG. 2 a 4 stages pressure drop design is represented, having three chambers or intermediate stages:
(4) A lower ring chamber around the plug (3) inside the seat ring (1).
(5) A middle chamber inside the plug (3).
(6) An upper chamber around the plug (3) inside the cylinder (2).

With this layout the flow comes from the high pressure side from under the seat ring through the holes of the seat ring cylinder (1-4) which is the first restriction, to the chamber (4) which is the first stage. Before it goes to the middle chamber, the fluid has to pass a second pressure drop (4-5) across the lower part of the plug to reach an intermediate pressure.

Until here the flow went from outside to inside the plug. From here it will go upwards and then from inside to outside the plug. So the fluid goes through restriction (5-6) in the upper part of the plug and reaches the balancing chamber (6) which is the third pressure stage. Finally after going to restriction (6-2) in the cylinder, the fluid reaches output pressure.

In this simple way, with one plug (3) one seat ring (1) and one cylinder (2), a high pressure drop across the valve is divided into 4 smaller pressure drops and all the problems associated to a high pressure drop, are avoided.

Additionally the chambers (6) and (4) act as balancing chambers, and all horizontal forces around the plug (3) are balanced.

So the plug (3) is not pushed in any horizontal direction (as commonly happens is existing designs) because it is "floating" within the cylinder (2), reducing to a minimum the friction and allowing a smooth vertical movement. The plug (3) is balanced in horizontal direction.

Finally by selecting properly the area of the chambers (6), (4) and (5) the plug is also balanced in the vertical direction. In fact pressure in chambers (6) and (4) pushes the plug (3) upwards. Pressure in chamber (5) pushes downwards the plug. The correct sizing of the diameters of these chambers with make the upwards, and downwards forces to be balanced. In this way the displacement of the plug will be smooth.

As a conclusion, the proposed design solves three different problems:

Eliminates noise and vibration associated to large pressure drop, by dividing total pressure drop in several smaller pressure drops, in a very simple way, with a reduced number of components.

Reduces friction of plug and cylinder, by creating balancing chambers around the plug which suppresses horizontal forces, for the first time.

Reduces the force required to move the plug in the vertical direction, by a correct sizing of the balancing chambers.

I claim:

1. A high-pressure reducing control valve having an inlet side and an outlet side comprising:

a valve body cylinder (2) having a plurality of ports (6-2) facing the outlet side of the valve;

an extended, cup-shaped seat ring (1) having an open top, a closed bottom and a stepped bore comprising a plurality of first steps, the seat ring having a cross-sectional width greater at the top than at the bottom and a plurality of inlet ports located at a particular one of the first steps (1-4) which face the inlet side of the valve;

a stepped plug (3) inserted into said seat ring and having a top positioned within said valve body cylinder, a hollow body and a middle chamber (5) formed within the hollow body, said hollow body having an open bottom and a stepped exterior comprising a plurality of second steps and whose cross-sectional width is greater at the top than at the bottom and which mates with the stepped bore of the seat ring and the bore of the cylinder respectively, said plug further having a plurality of restriction ports (4-5) located in front of the inlet ports of the seat ring (1-4) and a plurality of restriction ports (5-6) located in front of the outlet ports of the cylinder (6-2); and wherein once the plug is inserted into said seat ring a plurality of lower ring chambers (4) are formed between said inlet ports and the inlet ports of the seat ring and a plurality of upper ring chambers are formed between said outlet ports and the outlet ports of the cylinder thereby establishing a fluid path from said inlet ports, through said lower ring chambers (4), through the middle chamber (5), through said restriction ports into said upper ring chambers (6) and out the outlet ports.

2. Control valve, according to claim 1, having a plurality of fluid pressure reducing stages formed by the cylinder, the plug and the seat ring such that a fluid pressure is reduced as the fluid passes through each one of said plurality of fluid pressure reducing stages.

3. Control valve, according to claim 2, wherein the fluid pressure reducing stages are sized such that the fluid pressure reduction is controlled so as to prevent sonic gas or cavitating liquid conditions.

4. Control valve, according to claim 1 wherein the upper and lower ring chambers are sized such that horizontal fluid forces acting upon said plug and said seat ring are balanced with respect to each other as to cause the plug to be horizontally balanced within the seat ring.

5. Control valve, according to claim 1 wherein the upper and lower ring chambers are sized such that vertical fluid forces acting upon said plug and said seat ring are balanced with respect to each other as to cause the plug to be vertically balanced within the seat ring.

* * * * *